US012800473B2

(12) United States Patent
AlSharif et al.

(10) Patent No.: US 12,800,473 B2
(45) Date of Patent: Nov. 17, 2026

(54) MONITORING PIPELINE CORROSION

(71) Applicant: Saudi Arabian Oil Company, Dhahran (SA)

(72) Inventors: Layan AlSharif, Dhahran (SA); Mohammed Alshahrani, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 269 days.

(21) Appl. No.: 18/461,149

(22) Filed: Sep. 5, 2023

(65) Prior Publication Data

US 2025/0076181 A1 Mar. 6, 2025

(51) Int. Cl.
*G01N 17/04* (2006.01)
*G01K 7/22* (2006.01)

(52) U.S. Cl.
CPC ............... *G01N 17/04* (2013.01); *G01K 7/22* (2013.01)

(58) Field of Classification Search
CPC ................................. G01K 7/22; G01N 17/04
See application file for complete search history.

(56) References Cited

U.S. PATENT DOCUMENTS 7,526,944 B2 5/2009 Sabata et al.
8,085,165 B2 * 12/2011 Wavering ................. H04Q 9/00 340/870.02
8,261,601 B2 9/2012 Stolle et al.
9,109,988 B2 8/2015 Morgan et al.
9,291,543 B1 3/2016 Robinson et al.
10,330,586 B2 6/2019 Ulmer
11,619,576 B2 4/2023 Kiyono et al.
2005/0078557 A1 * 4/2005 Andersen ............. G01N 31/229 73/29.04
2006/0162431 A1 7/2006 Harris et al.
2007/0239089 A1 * 10/2007 Chiu .................. A61H 15/0078 601/99
2011/0210014 A1 9/2011 Garosshen
2015/0268152 A1 9/2015 Friedersdorf et al.

FOREIGN PATENT DOCUMENTS

CN 110044976 A 7/2019
KR 20130056589 5/2013
KR 20150025605 3/2015
KR 101519438 5/2015

(Continued)

OTHER PUBLICATIONS

Advanced Polyimide Materials, Yang (ed)., 2018, Chapter 5, 61 pages.

(Continued)

*Primary Examiner* — Lee E Rodak
*Assistant Examiner* — Taqi R Nasir
(74) *Attorney, Agent, or Firm* — Fish & Richardson P.C.

(57) ABSTRACT

Systems and methods for monitoring pipeline corrosion include a corrosion sensor. The corrosion sensor includes a nonconductive substrate; a non-corroding thermistor coupled to the nonconductive substrate; a hygroscopic layer coupled to the nonconductive substrate; glass micro/nano-fibers embedded in the hygroscopic layer; and corrodible interdigitated electrodes coupled to the hygroscopic layer.

20 Claims, 4 Drawing Sheets

(56) References Cited

FOREIGN PATENT DOCUMENTS

WO WO-2019044640 A1 * 3/2019 ........... G01N 27/048

OTHER PUBLICATIONS

Ansari, et al., "Investigation of distributed moisture and temperature measurements in transformers using fiber optics sensors," IEEE Transactions on Power Delivery, Aug. 2019, 34(4):1776-1784, 9 pages.
Ban et al., "A novel capacitance sensor for fireside corrosion measurement," Review of Scientific Instruments, 2009, 80(11):115107, 7 pages.
Berruti et al., "A comparative study of radiation-tolerant fiber optic sensors for relative humidity monitoring in high-radiation environments at CERN," IEEE Photonics Journal, Dec. 2014, 6(6):16 pages.
Brondel et al., "Corrosion in the Oil Industry," Oilfield Review, Apr. 1994, 6(2):4-18, 15 pages.
Cheng et al., "Simulation of a novel capacitive sensor for rebar corrosion detection," Construction and Building Materials, Apr. 2018, 174:613-624, 12 pages.
Clarke, "Wien Bridge Oscillator Design," Proceedings of the I.R.E., Feb. 1953, 41(2):246-249, 4 pages.
Data acquisition and signal processing for smart sensors, Kirianaki et al., Mar. 2002, pp. 51-60, 290 pages.
Feng et al., "Effects of $CO_2$ and $H_2S$ on Corrosion of Martensitic Steels in Brines at Low Temperature," Mar. 2018, Corrosion, 74(3):276-287, 12 pages.
Feng et al., "Electrochemical Corrosion of Ultra-High Strength Carbon Steel in Alkaline Brines Containing Hydrogen Sulfide," Electrochima Acta, Sep. 2016, 212:998-1009, 12 pages.
Gu, et al., "A novel capacitive-type humidity sensor using CMOS fabrication technology," Sensors and Actuators B: Chemical, May 2004, 99(2-3):491-498, 8 pages.
Harrey et al., "Capacitive-type humidity sensors fabricated using the offset lithographic printing process," Sens. Actuators B, Dec. 2002, 87(2):226-232, 7 pages.
Kang et al., "A High-Speed Capacitive Humidity Sensor with On-Chip Thermal Reset," IEEE Trans. Electron Devices, Apr. 2000, 47(4):702-709, 9 pages.
Kraus et al., "Plasmapolymerized silicon organic thin films from HMDSN for capacitive humidity sensors," Sensors and Actuators B: Chemical, Feb. 2003, 88(3):300-311, 12 pages.
Kronenberg et al., "Relative humidity sensor with optical fiber Bragg gratings," Optics Letters, Aug. 2002, 27(16):1385-1387, 3 pages.
Kuzubasoglu, Recent Studies on the Humidity Sensor: A Mini Review. ACS Applied Electronic Materials, 2022, 4(10):4797-4807, 11 pages.
Lee et al., "Humidity Sensors: A Review," Sensor Letters, 2005, 3(1):14 pages.
Lu et al., "A multifunctional fiber optic sensor for internal corrosion monitoring in natural gas transmission pipelines" CORROSION Conferences & Expo, 2018, Phoenix, Arizona, Apr. 2018, 12 pages.
Najeeb et al., "Organic Thin-Film Capacitive and Resistive Humidity Sensors: A Focus Review" Advanced Materials Interfaces, Sep. 2018, 5(21):18009691, 19 pages.
Nishio "Quality Evaluation of Fiber-Optic Strain Data Acquired in Long-Term Bridge Monitoring," Sensors and Materials, 2017, 29(2):141-152, 12 pages.
Okafor et al., "Effect of Acetic Acid on $CO_2$ Corrosion of Carbon Steel in Vapor-Water Two-Phase Horizontal Flow," Chem. Eng. Commun, Feb. 2007, 194(2):141-157, 17 pages.
Oliva et al., "Temperature coefficient of resistance and thermal expansion coefficient of 10-nm thick gold films," Thin Solid Films, Feb. 2017, 623:84-89, 27 pages.
Park et al., "Enhanced Moisture-Reactive Hydrophilic-PTFE-Based Flexible Humidity Sensor for Real-Time Monitoring," Sensors, 2018, 18(3):921, 9 pages.
Rafefi, "Development of Thin Film Electrical Resistance Sensors for In Situ Monitoring of Top of the Line Corrosion," Thesis for the degree of Doctor of Philosophy, University of Manchester, 2020, 341 pages.
Rustandi et al., "Corrosion rate of carbon steel for flowline and pipeline as transmission pipe in natural gas production with CO2 content," Makara Journal of Technology, Apr. 2012, 16(1): 57-62, 6 pages.
Sarma et al., "A real-time data acquisition system for monitoring sensor data," Int. J. Comput. Sci. Eng, Jun. 2018, 6(6):539-542, 5 pages.
Singer et al., "Experimental study of sour top-of-the-line corrosion using a novel experimental setup," Corrosion, Jun. 2013, 69:624-638, 15 pages.
Singer et al., "Sour top-of-the-line corrosion in the presence of acetic acid," Corrosion, Aug. 2011, 67(8):085003-1-085003-16, 16 pages.
Tai et al., "Paper-Based Sensors for Gas, Humidity, and Strain Detections: A Review," ACS Appl. Mater. Interfaces, 2020, 12, 28, 31037-31053, 66 pages.
Wright et al., "Electrolessly coated optical fibers for distributed corrosion monitoring," In CORROSION, Mar. 24-28, 2019, Nashville, TN, 19 pages.
Wright et al., "Metallic Film-Coated Optical Fiber Sensor for Corrosion Monitoring at High Pressures," In AMPP Annual Conference+ Expo in San Antonio, Texas, Paper No. 17804, Mar. 6-10, 2022, 11 pages.
Wright et al., "Effect of HCO3—on Electrochemical Kinetics of Carbon Steel Corrosion in CO2-Saturated Brines," Electrochim. Acta, Nov. 2018, 290:626-638, 45 pages.
Xu et al., "Development of a real-time AC/DC data acquisition technique for studies of AC corrosion of pipelines" Corrosion Science, 2012, 61: 215-223, 9 pages.
Yeo et al., "Characterisation of a polymer-coated fibre Bragg grating sensor for relative humidity sensing," Sensors and Actuators B: Chemical, 2005, 110(1):148-156, 8 pages.
Zhang et al., "Ultrasensitive skin-like wearable optical sensors based on glass micro/nanofibers," Opto-Electronic Advances, 2020, 3(3): 190022-1-190022-7, 7 pages.
SAIP Examination Report in Saudi Arabian Appln. No. 1020244887, mailed on Jul. 20, 2026, 8 pages (with English translation).

* cited by examiner

MONITORING PIPELINE CORROSION

TECHNICAL FIELD

This disclosure relates to monitoring corrosion in pipelines, for example, in oil and gas pipelines.

BACKGROUND

Corrosion is a process in which a material deteriorates through chemical or electrochemical reactions with the environment in which the material is placed. For example, iron deteriorates through the formation of iron oxides (e.g., rust) in the presence of oxygen. The rate at which the material deteriorates can depend on many factors including the material, the chemical composition of the environment, and any corrosion protective or preventative measures being used.

Top-of-line corrosion (TLC) is a type of corrosion that happens in natural gas pipelines when temperature gradients between the working fluid and the outside environment lead to water condensation on the internal walls of the pipeline. When corrosion inhibitors are injected into a pipe operated in a stratified gas-liquid pipe flow condition, the corrosion inhibitors remain at the bottom of the line and may not protect the top of the line. The condensed water can be corrosive to steel when it contains dissolved acidic species such as carbon dioxide, hydrogen sulfide and organic acids. Corrosion products can also accumulate in the condensed liquid leading to increased pH (e.g., decreased acidity) and possible formation of protective corrosion product films.

SUMMARY

This disclosure describes systems and methods for monitoring corrosion in pipelines. A multifunctional corrosion sensor detects and measures corrosion, water condensation rates, and temperatures in gas pipelines. The corrosion sensor includes a capacitive element, a hygroscopic material (e.g., a material able to absorb moisture from the environment) with embedded glass micro/nanofibers (MNFs), a thermistor element, and a non-conductive substrate. Capacitance, resistive, and optical changes from the corrosion sensor are used to determine the corrosion rates, condensation rates, and temperature. The corrosion sensor can be coupled to a data acquisition module to collect and record data from the corrosion sensor.

Implementations of the systems and methods of this disclosure can provide various technical benefits. The corrosion sensor includes resistive, optical, and capacitive sensing elements to distinguish effects of water condensation and metallic film dissolution on the measured quantities (e.g., resistance and strain). The flexibility of the corrosion sensor allows the corrosion sensor to be used in pipelines having various diameters and curvature shapes. The sensor is coupled with a data acquisition module including one or more processors for real-time monitoring of gas pipelines without influence on normal pipeline operation. For example, real-time monitoring can include real-time measurements of corrosion rates, water condensation rates, and/or temperatures. The corrosion sensor can obtain corrosion measurements while installed in the pipeline without interrupting normal pipeline operations. Corrosion rates can be measured at multiple instances in time during exposure of a corrosion sensor to a corrosive environment. Corrosion rates can be obtained in environments with a low conductivity and discontinuous electrolyte. Water condensation rates and corrosion rates can be obtained at the same location as a result of the stacked interdigitated electrodes and hygroscopic layers of the corrosion sensor. The materials of elements of the corrosion sensor (e.g., material of interdigitated electrodes) can match the materials used in the intended environment (e.g., material of pipeline walls). The embedded MNFs can be shaped to provide coverage of a desired area of the corrosion sensor for improved condensation sensing. For example, embedded MNFs in a serpentine shape can detect.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes methods and systems for monitoring corrosion in pipelines. A corrosion sensor detects and measures corrosion, water condensation rates, and temperatures in gas pipelines. The corrosion sensor includes a capacitive element, a hygroscopic material with embedded glass micro/nanofibers (MNFs), a thermistor element, and a non-conductive substrate. Capacitance, resistive, and optical changes from the corrosion sensor are used to determine the corrosion rates, condensation rates, and temperature. The corrosion sensor can be coupled to a data acquisition module including one or more processors to collect and record data from the corrosion sensor.

Figure 1B:
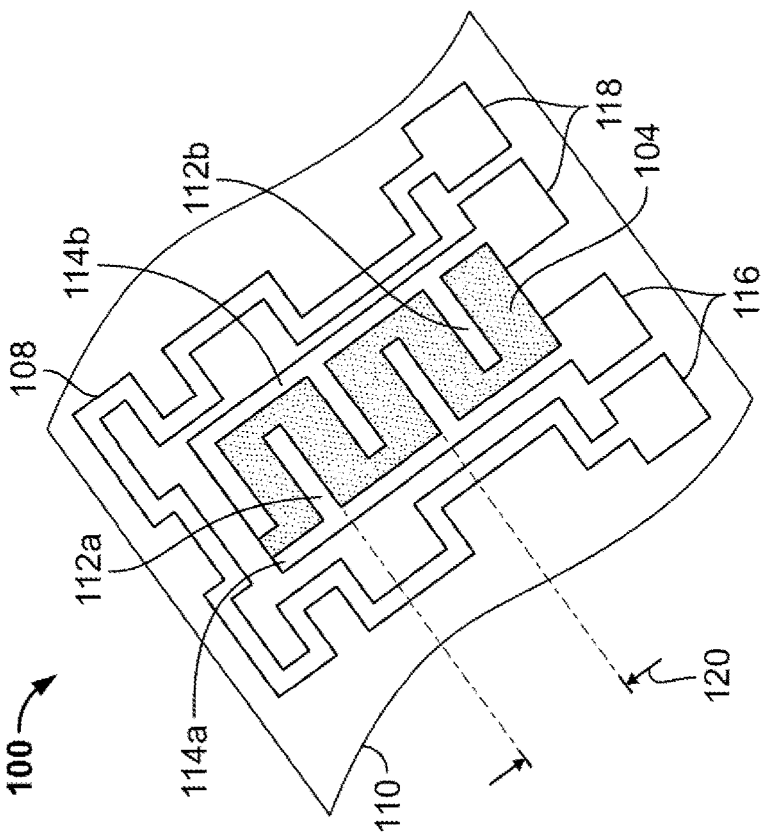
FIG. 1A-1B are an exploded view and a top view of a corrosion sensor.
Figure 1A:
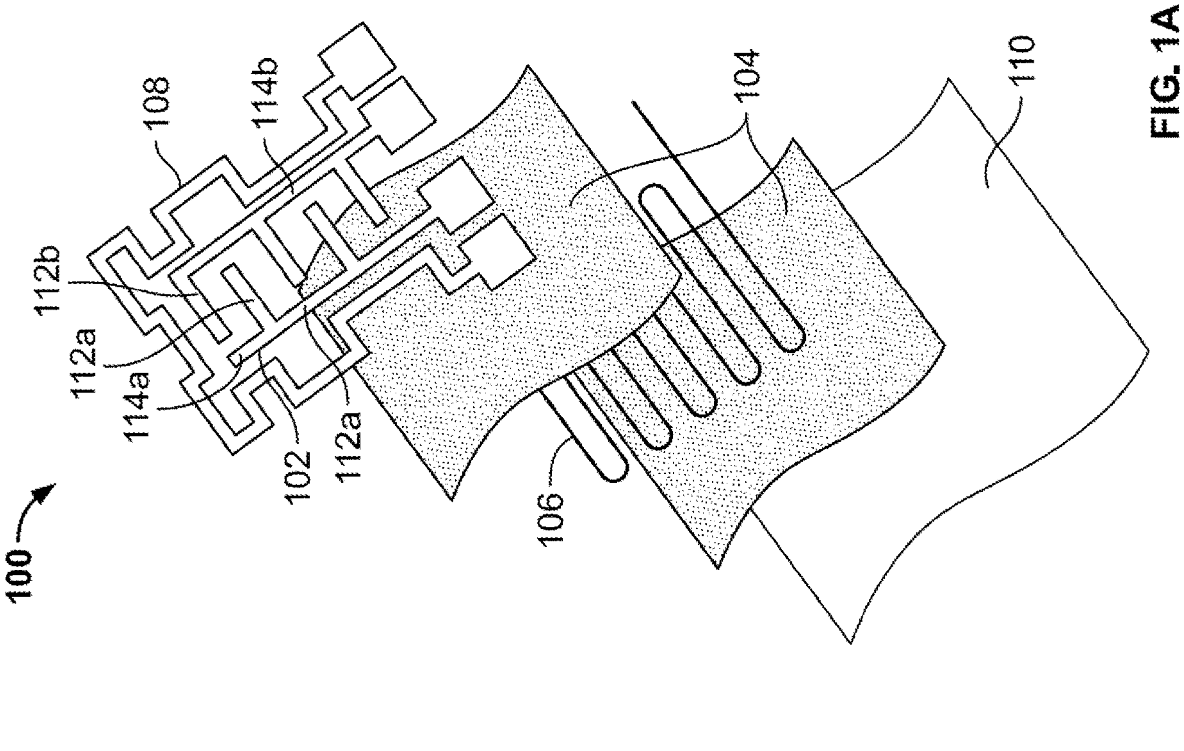

FIGS. 1A-1B are views of an example corrosion sensor 100. The corrosion sensor 100 includes interdigitated electrodes 102, a hygroscopic layer 104 with embedded glass MNFs 106, a thermistor 108, and a non-conductive substrate 110. The hygroscopic layer 104 and the thermistor 108 are coupled to the non-conductive substrate 110. The interdigitated electrodes 102 are coupled to the hygroscopic layer 104.

The interdigitated electrodes 102 define a capacitive element. The interdigitated electrodes 102 include a metal configured as a planar pair of electrodes 112*a-b*. In this arrangement, a first set of electrodes 112*a* are electrically connected to a first bus bar 114*a* and second set of electrodes 112*b* extend from a second bus bar 114*b*. The first and second bus bars 114*a-b* connect to a positive terminal 116 and a negative terminal 118. The first and second sets of electrodes 112*a-b* have a predefined spacing 120 between electrodes connected to the same bus bar 114*a-b*. The electrodes in the first set of electrodes 112*a* are positioned between electrodes of the second set of electrodes 112*b*.

The interdigitated electrodes 102 can be formed of a corrodible material (e.g., copper, a copper alloy, or an aluminum alloy, such as an aluminum/copper alloy, or aluminium/silicon alloy, etc.). The lifetime of the sensor depends at least in part on the thickness of the corrodible material. For example, a thin layer of corrodible material can have a shorter lifetime than a thicker layer of the corrodible material.

In some implementations, (e.g., monitoring top of line corrosion), the material of the interdigitated electrodes 102 can match the material of the intended pipeline. For example, the interdigitated electrodes 102 can be made from carbon steel, which is a commonly used material for pipelines and flowlines in the oil and gas industry. Carbon steel is reactive, and in the presence of $CO_2$, can form iron carbonate, e.g., $FeCO_3$.

When power is applied to the positive terminal 116 and negative terminal 118, an electric field is generated between the electrodes. The capacitance of the interdigitated electrodes 102 depends on the number, width and overlap of electrodes in the first and second sets of electrodes 112*a-b*. The capacitance also depends on the dielectric constant and thickness of the substrate on which it is printed (e.g., the hygroscopic layer 104).

Prior to corrosion of the interdigitated electrodes 102, the electrodes have an initial thickness ($t_o$) and capacitance ($C_o$). As the interdigitated electrodes 102 corrode, corrosion products (e.g., iron carbonate) form, increasing the electrode thickness. The cross-section of the conductive metal also decreases. Both the increase in electrode thickness and the reduced cross-section of conductive metal alter the capacitance of the interdigitated electrodes 102. The capacitance can be determined from the following equation:

$$C = \varepsilon_o \varepsilon_r \left(\frac{A}{d}\right) \quad (1)$$

where $\varepsilon_0$, is the permittivity of free space, $\varepsilon_r$ is the dielectric permittivity of the material, A is the electrode area, and d is the thickness of the dielectric. The positive and negative terminals 116, 118 can be made from a metal highly resistant to corrosion, such as gold or platinum, and/or can be covered by a protective film to prevent exposure to the environment (e.g., a corrosive environment).

The hygroscopic layer 104 serves as the dielectric between the interdigitated electrodes 102. The hygroscopic layer 104 can absorb and evaporate water. The absorption of condensed water by the hygroscopic layer 104 changes the dielectric constant of the hygroscopic layer 104, and consequently, the capacitance of the interdigitated electrodes 102 changes. The hygroscopic layer 104 spans the area of the interdigitated electrodes 102, excluding the positive and negative terminals 116, 118.

The hygroscopic layer 104 can be made from materials with an affinity to water molecules and highly exposed surface areas so as to achieve high sensitivity, fast response, and low hysteresis of the corrosion sensor 100. In some implementations, the hygroscopic layer 104 includes a dielectric material such as a hygroscopic polymer including cellulose acetate butyrate (CAB), polyacetylene (PA), polyaniline (PANT), poly(methyl methacrylate) (PMMA), polypyrrole (PPY), polymethyl methacrylate, polyimide, plasma polymerized hexamethyldisilazane (HMDSN), polytetrafluoroethylene (H-PTFE), and polyethersulfone. In some implementations, the hygroscopic layer includes a ceramic dielectric material such as $MgCr_2O_4$, $TiO_2$ and $Al_2O_7$.

The hygroscopic layer 104 includes embedded glass MNFs 106. The MNFs can include internal gratings or similar mechanisms (e.g., long period fiber gratings) that alter the wavelength of transmitted light in response to changes in strain of the MNFs. MNFs provide high surface-to-volume ratios for high sensitivity. The MNFs integrate easily with other components due to their small size, adaptability, and low cost. The MNFs do not interfere with electrical or magnetic fields do to their nonconductivity.

The glass MNFs 106 form an optical sensor that can be used to determine the contributions of water condensation and metal corrosion on the capacitance of the interdigitated electrodes 102. Volume changes in the hygroscopic layer 104 as it absorbs water induce micro-strains in the embedded MNFs 106. Water condensation rates can be determined by measuring changes in the optical transmission through the MNFs 106.

The flexibility of the MNFs 106 allows the MNFs to be shaped into any configuration. In some implementations, the MNFs 106 are shaped into a serpentine shape. A serpentine shape can provide surface coverage of the hygroscopic layer 104 to capture effects of water droplets that may spread over the surface area of the corrosion sensor 100. In some implementations, multiple MNFs can be placed in an array for spatial water condensation sensing. Micro strains induced at net-joint areas where the MNFs cross paths can be used to determine the location and size of water droplets. The spacing of MNFs in an array can determine the spatial coverage of the MNFs. For example, a higher spatial resolution of water sensing is realized using a smaller MNF spacing.

The thermistor 108 element includes a non-corrodible metal responsive to temperature changes. For example, the thermistor 108 can include a material that experiences a change in electrical resistivity with a change in temperature. The thermistor is positioned adjacent to the interdigitated electrodes 102 to experience the same environmental temperature. The thermistor 108 is coupled to the non-conductive substrate 110. In some implementations, the thermistor material is gold (Au), whose resistance changes with temperature with a temperature coefficient of resistance (TCR) given by 0.0034 per ° C.

In some implementations, the non-conductive substrate 110 includes a flexible material. The flexibility of the non-conductive substrate 110 can allow it to intimately follow the profile of a curved surface. Example flexible, non-conductive materials include polydimethylsiloxane (PDMS) rubber, polyamide (PI), polyester (PE), polyethylene terephthalate (PET), and polyethylene naphthalate (PEN). In some implementations, the surface of the non-conductive substrate 110 is pre-treated to increase the wettability of the substrate to aid proper spreading of deposited metallic electrodes. Common methods to increase the wettability of the substrate include plasma treatment, corona treatment, surface salinization, and polyelectrolyte coating.

Figure 2:
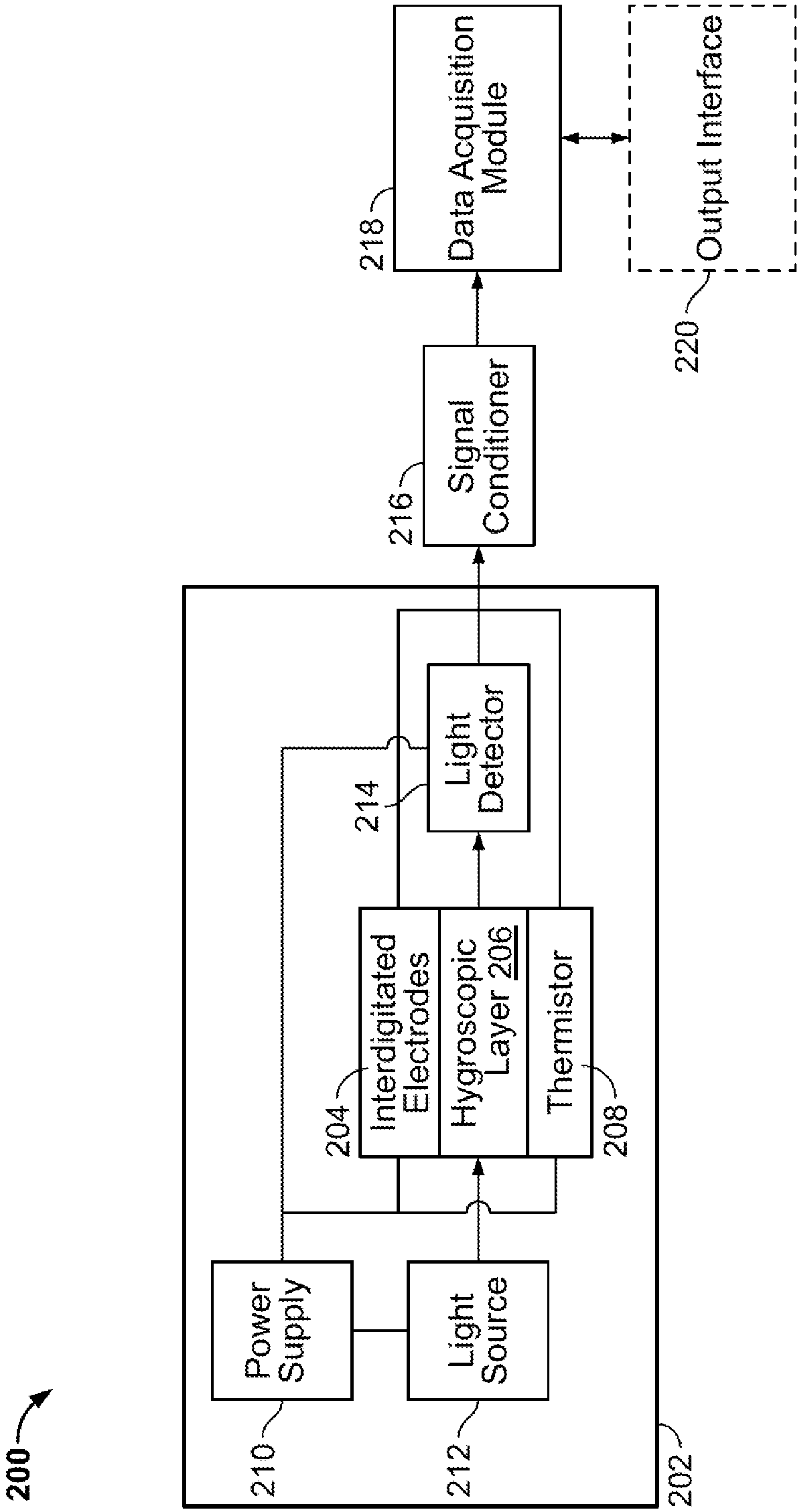
FIG. 2 is a block diagram of the corrosion sensor system.

FIG. 2 is a block diagram of a system 200 for monitoring corrosion in a pipeline. The system 200 includes a corrosion sensor 202 (e.g., corrosion sensor 100). The corrosion sensor 202 includes interdigitated electrodes 204, a hygroscopic layer 206 with embedded glass MNFs, and a thermistor 208. A power supply 210 is electrically connected to the interdigitated electrodes 204, the thermistor 208, a light source 212, and a light detector 214. The light source 212 provides light to embedded glass MNFs in the hygroscopic layer 206.

The light detector 214 receives transmissions of light from the glass MNFs in the hygroscopic layer 206.

The light source 212 can be a broadband light source (e.g., a light emitting diode (LED) or a superluminescent diode). The light source 212 can be coupled to the MNFs in the hygroscopic layer 206 via an optical fiber. The light detector 214 can be for example a photodiode, a phototransistor, a photomultiplier tube (PMT), or an avalanche photodiode (APD).

Measurement signals from the corrosion sensor 202 (e.g., signals from the interdigitated electrode 204, the thermistor 208, and/or the light detector 214) pass through a signal conditioner 216. The signal conditioner 216 reduces signal noise by, for example, amplifying weak signals and/or applying filters to the signals (e.g., low-pass filters, bandpass filters, and high-pass filters). In some implementations, the signal conditioner includes analog circuitry to filter and/or amplify the measurement signals from the corrosion sensor. In some implementations, the signal conditioner includes software or firmware to filter and/or amplify digital measurement signals from the corrosion sensor.

The conditioned signals pass from the signal conditioner 216 to a data acquisition module 218. The data acquisition module includes an acquisition card having one or more processors to receive, record, and save to memory or storage electrical signals received from the signal conditioner 216. The data acquisition module processes the signals and converts the conditioned signals into data representative of the physical properties of the corrosion sensor 202. Example physical properties include thickness of the interdigitated electrodes 204, water saturation of the hygroscopic layer 206, and temperature. The data acquisition module can include circuitry to transmit and receive data from external computing devices over wired and/or wireless networks.

An output interface 220 can receive the data from the data acquisition module 218 and display a corrosion status of the corrosion sensor 202. For example, the output interface can generate a visual representation (e.g., a plot) of the physical properties versus time showing the corrosion rate, water condensation rate or temperature of a pipeline. The output interface 220 can be a remote device and can receive data from the data acquisition module 218 via a wired or wireless network.

In some implementations, the data acquisition module receives, processes, and transmits data from the corrosion sensor 202 in real-time. Real-time or near real-time processing refers to a scenario in which received data (e.g., corrosion data) are processed as made available to systems and devices requesting those data immediately (e.g., within milliseconds, tens of milliseconds, or hundreds of milliseconds) after the processing of those data are completed, without introducing data persistence or store-then-forward actions. In this context, a real-time data processing system is configured to process corrosion data as quickly as possible (though processing latency may occur). Though data can be buffered between module interfaces in a pipelined architecture, each individual module operates on the most recent data available to it. The overall result is a workflow that, in a real-time context, receives a data stream (e.g., corrosion data) and outputs processed data based on that data stream in a first-in, first out manner. However, non-real-time contexts are also possible, in which data are stored (either in memory or persistently) for processing at a later time. In this context, modules of the data processing system do not necessarily operate on the most recent data available.

The light source 212, the light detector 214, power supply 210, signal conditioner 216, data acquisition module 218, and output interface 220 can be located outside the pipeline. These components can connect to the sensing elements via wires and optical fibers, for example.

In some implementations, the corrosion sensor 202 includes an internal power supply 210 (e.g., a battery). The battery size can be chosen, for example, based on the duration of operation of the sensor and the accessibility of the pipeline.

In some implementations, the data acquisition module 218 includes the signal conditioner 216. For example, the data acquisition module 218 can include software or firmware to digitally condition received signals. Some implementations do not include the signal conditioner 216.

Figure 3:
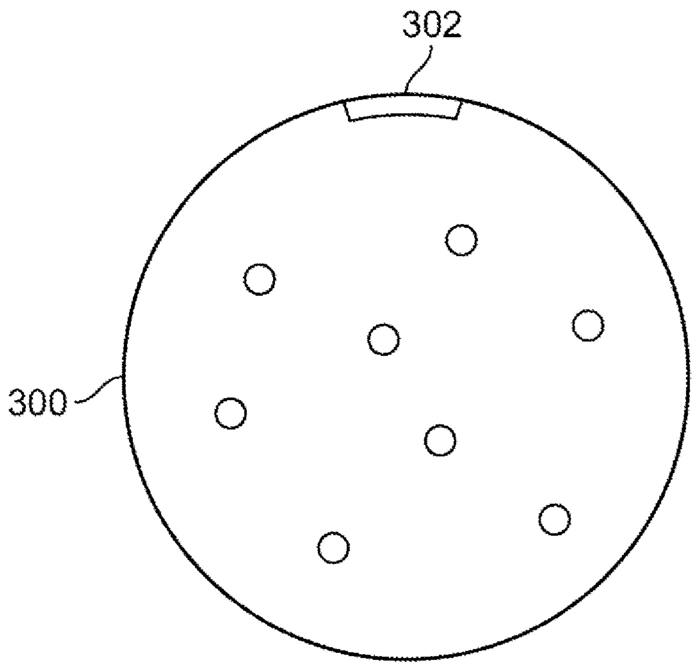
FIG. 3 is a schematic view of the corrosion sensor installed in a pipeline.

FIG. 3 is a schematic view of a cross-section of a gas pipeline 300 with a corrosion sensor 302. The corrosion sensor 302 is installed at the top of the gas pipeline 300. The flexibility of the corrosion sensor 302 allows the corrosion sensor 302 to conform to the curvature of the gas pipeline 300. The sensor is attached to the internal side of the pipeline by, for example, using an adhesive compatible with the nonconductive substrate of the corrosion sensor and the pipeline material (e.g., a waterproof, double-sided adhesive base). The corrosion sensor 302 can be located at a position in the pipeline where corrosion and condensation are expected to occur. For example, at a location where the temperature gradients are large compared with other locations in the pipeline.

In some implementations, multiple corrosion sensors are installed in the pipeline 300 (e.g., at different locations along the length of the pipeline) where the corrosion behavior is to be monitored. The multiple sensors can be connected to a single data acquisition module. Alternatively, or additionally, the multiple sensors can be connected to multiple data acquisition modules.

Corrosion sensors can be installed in the pipeline on an on-going basis to monitor the corrosion in the pipeline. Alternatively, or additionally, the corrosion sensor can be installed for short term tests at locations identified to have risks of corrosion. The locations can be identified during, for example, routine pipeline maintenance. In some implementations, the corrosion sensors can be used in a laboratory setting.

Figure 4:
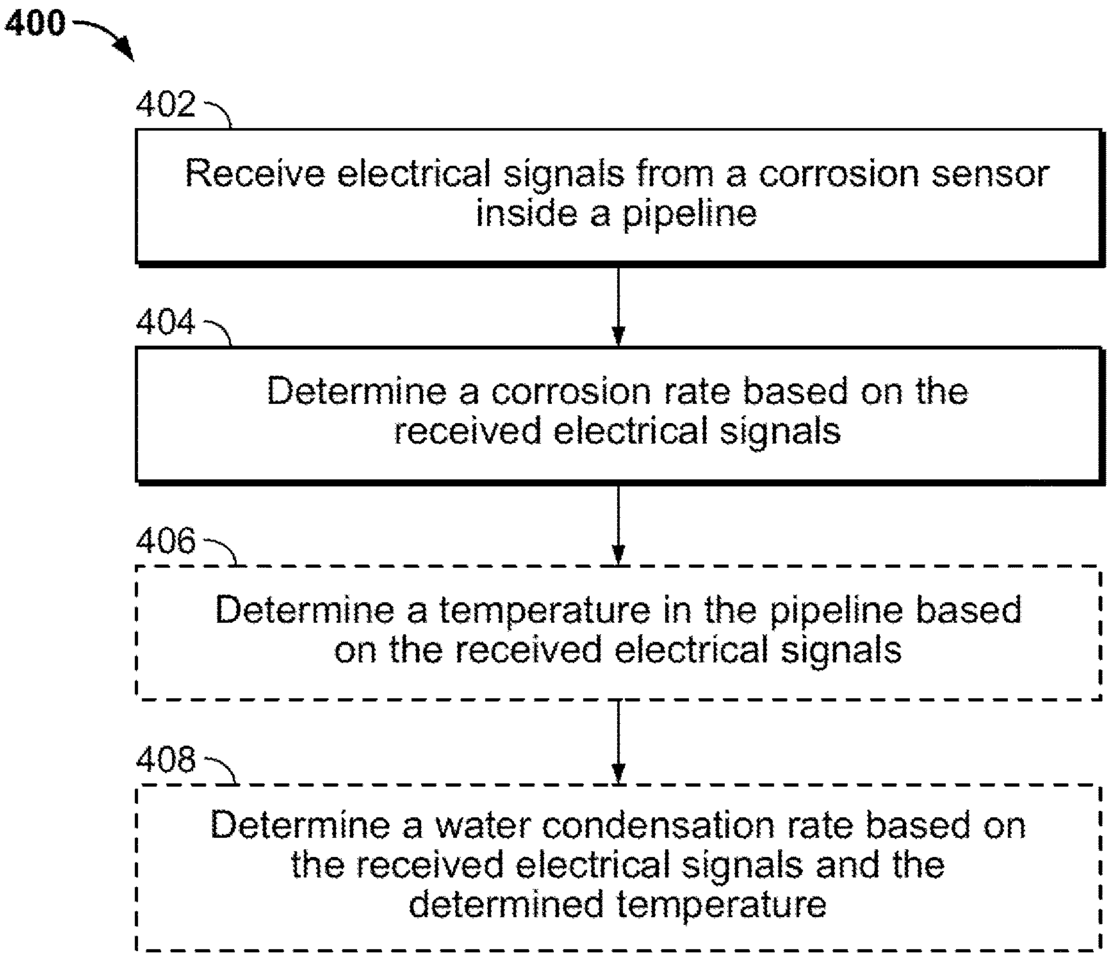
FIG. 4 is a flow chart of a method for monitoring pipeline corrosion.

FIG. 4 is a flow chart for an example method 400 of monitoring corrosion in a pipeline. Steps of method 400 can be implemented, for example, on a data processing system or data acquisition module (e.g., data acquisition module 218).

The data processing system receives electrical signals from a corrosion sensor inside the pipeline (step 402). The corrosion sensor (e.g., corrosion sensor 100, 202) includes interdigitated electrodes, a hygroscopic layer, and a thermistor. The electrical signals are representative of states of the thermistor, the interdigitated electrodes, and the hygroscopic layer.

The data processing system determines a corrosion rate based on the states of the thermistor, the interdigitated electrodes, and the hygroscopic layer (step 404). For example, the received electrical signal (e.g., an alternating or direct current signal) can represent a capacitance of the interdigitated electrodes. A decrease in the capacitance overtime indicates corrosion of the corrosion sensor. The decrease in capacitance can be converted into a change of thickness of the interdigitated electrodes. In an example implementation, a change in thickness of 1 μm corresponds to an approximately 2.5% change in the capacitance of the interdigitated electrode. The change in capacitance can be calibrated with a change of thickness using, for example, equation 1. In some implementations, the change in capacitance can be calibrated with a change of thickness for a corrosion sensor experimentally, for example, in a laboratory setting.

In some implementations, the data processing system determines a temperature in the pipeline based on the state of the thermistor (step 406). The electrical signal representing the state of the thermistor can indicate an electrical resistance of the thermistor. A change in the resistance of the thermistor corresponds with a change of temperature in which the thermistor is in contact. The change in the resistance depends on the material of the thermistor. A non-corrodible material with a known relationship between temperature and resistance can be used. For example, an oscillation frequency of a Wien's bridge oscillator, can be related to the thermistor resistance. In an example, a glass-coated thermistor bead, pressure-protected in a thin-walled 0.8 mm diameter stainless steel tube, the frequency ranged from 2 to 6 kHz, when the temperature increased from −5 to +35° C.

In some implementations, the data processing system determines a water condensation rate based on the received electrical signal and the determined temperature (step 408). The glass MNFs embedded in the hygroscopic layer act as a transducer to measure the amount of water condensation of the hygroscopic layer. As the hygroscopic layer absorbs water the strain of the MNFs changes, and the wavelength of light transmitted through the MNFs changes. For example, the strain affects a grating period ($\Lambda$) of the MNFs which subsequently affects the wavelength of the transmitted light ($\lambda_B$) as can be seen in the equation below:

$$\lambda_B = 2\eta_{eff}\Lambda, \tag{2}$$

where $\eta_{eff}$ is the effective index of refraction of the MNF and is dependent on the core material of the fiber.

The stress and the strain on the sensor can be correlated to the temperature and moisture. (e.g., the water condensate), of the pipeline. There are several relationships in the literature that can be used to relate the change in the transmitted wavelength with the moisture content, and the temperature of the environment. The data processing system records the change in the wavelength. The data processing system can determine the condensation rate based on one or more of the following example relationships.

In an example, the relationship is dependent on the material properties of the MNFs along with the temperature and strain:

$$\frac{\Delta\lambda_B}{\lambda_B} = (1 - P_e)\varepsilon + [(1 - P_e)\alpha + \xi]\Delta T \tag{3}$$

where $P_e$ is the photoelastic constant of the optical fiber, $\varepsilon$ is the strain induced on the fiber, $\alpha$ is the thermal expansion coefficient of the fiber, $\xi$ is the fiber thermo-optic coefficient and $\Delta T$ is the change in temperature.

In another example, a linear relationship is established between the wavelength, temperature and air humidity:

$$\frac{\Delta\lambda_B}{\lambda_B} = S_{RH}\Delta RH + S_T\Delta T \tag{4}$$

where $S_{RH}$ and $S_T$ are the sensitivities of the relative humidity (RH) and the temperature on the fiber optic respectively.

In another example, a direct relationship is formed between the wavelength, temperature, and relative humidity:

$$\frac{\Delta\lambda_B}{\lambda_B} = S_{RH}\Delta RH + S_T\Delta T. \tag{5}$$

Data collected from the corrosion sensor (e.g., corrosion sensors 100, 202) provide information about the health and condition of the material and/or the environment inside a pipeline. One or more actions can be triggered in response to the collected data.

For example, in response to detecting corrosion, the data processing system can schedule maintenance and repair of the affected portion of the pipeline to prevent a corrosion induced failure. In some examples, in response to detecting corrosion at a critical stage (e.g., corroded areas near failure), the data processing system can generate one or more safety alerts (e.g., audible and/or visual alerts) in the area. In some examples, in response to detecting the temperature of the pipeline, the data processing system can control the heating and/or cooling mechanisms to achieve a temperature inside the pipeline that minimizes water condensation and corrosion risks.

In some implementations, the data processing system predicts future corrosion patterns and/or condensation patterns based on the collected data. For example, the data processing system identifies trends in the collected data and predicted patterns and determines potential problem areas in the pipeline. In some implementations, the data processing system determines one or more preventative maintenance tasks based on the collected data and the predicted patterns. In some implementations, the data processing system evaluates the effectiveness of mitigation measures deployed in the pipeline to prevent future corrosion.

In some implementations, the data processing system generates a database of corrosion rates determined from data collected from sensors made from different materials. In some implementations, the database includes data collected from multiple corrosive environments (e.g., sour top-of-line corrosion). In some implementations, the data processing system selects materials for use in a pipeline environment based on the generated database.

The corrosion sensor (e.g., corrosion sensors 100, 202) can be fabricated using microfabrication or large-scale printing techniques. For example, the interdigitated electrodes and metallic thermistor can be fabricated by depositing metallic layers using e-beam evaporation onto the hygroscopic layer and non-conductive substrate, respectively. Photolithography forms patterns of the interdigitated electrodes and metallic thermistor. In some implementations, the thickness of the metallic substrate can be increased using electroplating methods.

In some implementations, screen printing, spin coating, or drop-on-demand inkjet printing can be used to deposit the interdigitated electrodes onto the hygroscopic layer and the thermistor onto the non-conductive substrate.

In some implementations, the MNFs are fabricated by taper drawing silica glass optical fibers.

Figure 5:
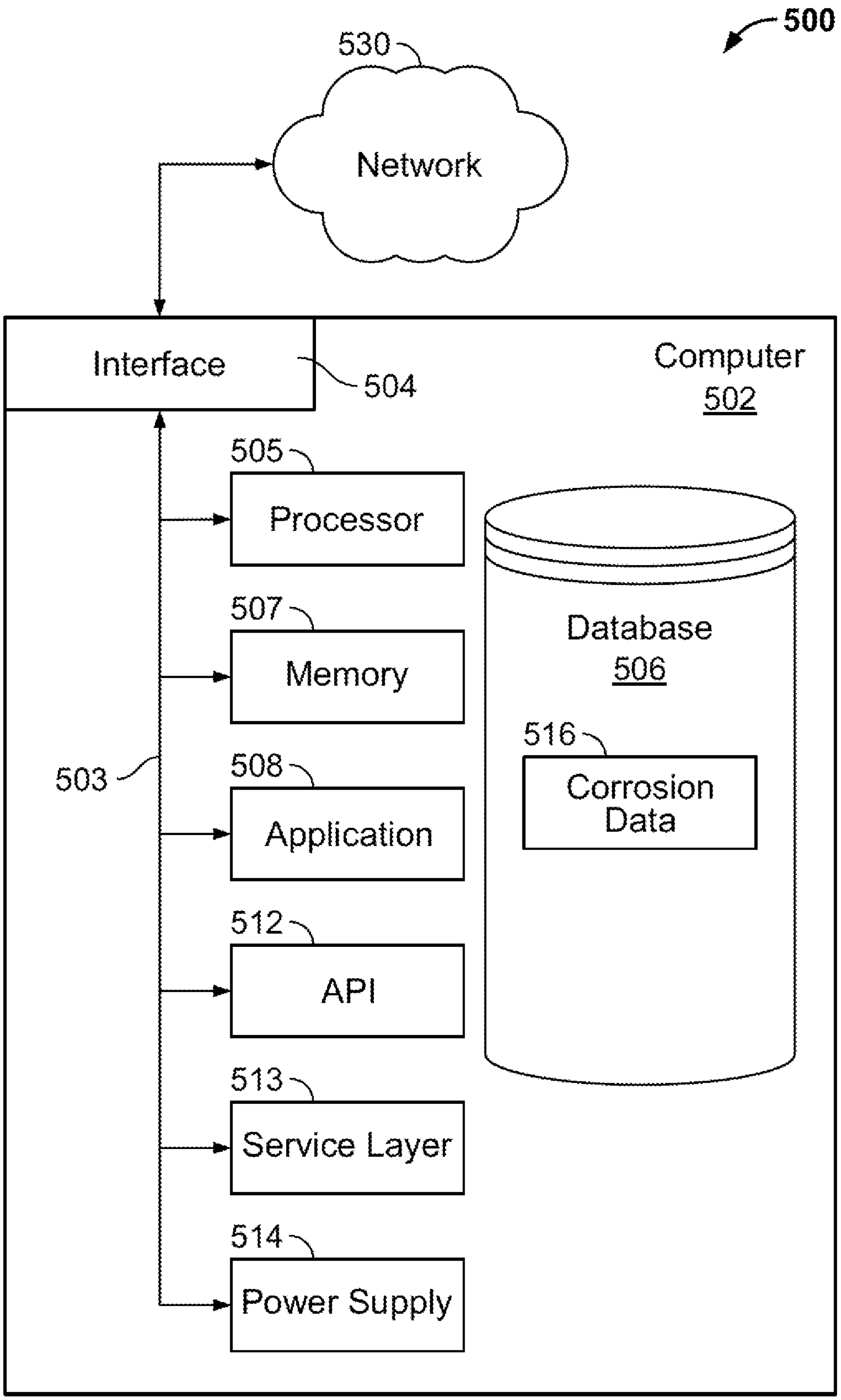
FIG. 5 is a block diagram illustrating an example computer system used to provide computational functionalities associated with described algorithms, methods, functions, processes, flows, and procedures according to some implementations of the present disclosure.

FIG. 5 is a block diagram of an example computer system 500 (e.g., data processing module 308 or remote device 310) used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UT) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, the database 506 can hold corrosion data 516. The database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not), Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

EXAMPLES

In an example implementation, a corrosion sensor includes a nonconductive substrate; a non-corroding thermistor coupled to the nonconductive substrate; a hygroscopic layer coupled to the nonconductive substrate; glass micro/nanofibers embedded in the hygroscopic layer; and corrodible interdigitated electrodes coupled to the hygroscopic layer.

In an aspect combinable with the example implementation, the nonconductive substrate comprises a flexible material.

In another aspect combinable with any of the previous aspects, the embedded glass micro/nanofibers have a serpentine shape.

In another aspect combinable with any of the previous aspects, the interdigitated electrodes include a first bus bar electrically connected to a positive electrical terminal; a first set of electrodes extending from the first bus bar with a predefined spacing between adjacent electrodes; a second bus bar electrically connected to a negative electrical terminal; and a second set of electrodes extending from the second bus bar with the predefined spacing between adjacent electrodes, the electrodes from the first set of electrodes are positioned between electrodes from the second set of electrodes.

In another aspect combinable with any of the previous aspects, the interdigitated electrodes include at least one of copper, a copper alloy, an aluminum alloy, carbon steel, and a material matching a material of a gas pipeline.

In another aspect combinable with any of the previous aspects, the hygroscopic layer includes a dielectric material.

In another aspect combinable with any of the previous aspects the hygroscopic layer includes a hygroscopic polymer or a ceramic material.

In another aspect combinable with any of the previous aspects, the hygroscopic polymer includes one or more of cellulose acetate butyrate, polyacetylene, polyaniline, polymethyl methacrylate, polypyrrole, polyimide, plasma polymerized hexamethyldisilazane, polytetrafluoroethylene, and polyethersulfone or the ceramic material includes one or more of $MgCr_2O_4$, $TiO_2$, and $Al_2O_3$.

Another aspect combinable with any of the previous aspects includes a power supply electrically coupled to the interdigitated electrodes and the non-corroding thermistor; a light source optically coupled to the glass micro/nanofibers; and a light detector optically coupled to the glass micro/nanofibers.

Another aspect combinable with any of the previous aspects, includes one or more processors communicatively coupled to the interdigitated electrodes, the non-corroding thermistor, and the light detector, the one or more processors configured to determine a corrosion rate based on electrical signals received from the interdigitated electrodes, the non-corroding thermistor, and the light detector.

In another example implementation, a method of monitoring corrosion in a pipeline includes receiving electrical signals from a corrosion sensor inside the pipeline, the corrosion sensor comprising a thermistor, interdigitated electrodes, and a hygroscopic layer having embedded glass micro/nanofibers, the electrical signals representing states of the thermistor, the interdigitated electrodes, and the hygroscopic layer; and determining a corrosion rate of the pipeline based on the states of the thermistor, interdigitated electrodes, and the hygroscopic layer.

In an aspect combinable with any of the example implementation, receiving electrical signals includes performing signal conditioning to reduce signal noise by performing at least one of amplifying the electrical signals and filtering the electrical signals.

In another aspect combinable with any of the previous aspects, the electrical signals include a resistance of the thermistor, a capacitance of the interdigitated electrodes, and a detected wavelength of light transmitted through the embedded glass micro/nanofibers.

In another aspect combinable with any of the previous aspects, determining the corrosion rate is based on the capacitance of the interdigitated electrodes.

Another aspect combinable with any of the previous aspects, includes determining a temperature inside the pipeline based on the resistance of the thermistor.

Another aspect combinable with any of the previous aspects includes determining a rate of water condensation inside the pipeline based on the determined temperature and the detected wavelength of light.

What is claimed is:

1. A corrosion sensor comprising:

a nonconductive substrate;

a non-corroding thermistor coupled to the nonconductive substrate;

a hygroscopic layer coupled to the nonconductive substrate;

glass micro/nanofibers embedded in the hygroscopic layer, the glass micro/nanofibers configured to alter a wavelength of transmitted light in response to changes in strain caused by absorption or evaporation of water from the hygroscopic layer; and corrodible interdigitated electrodes coupled to the hygroscopic layer.

2. The corrosion sensor of claim 1, wherein the nonconductive substrate comprises a flexible material.

3. The corrosion sensor of claim 1, wherein the embedded glass micro/nanofibers have a serpentine shape.

4. The corrosion sensor of claim 1, wherein the interdigitated electrodes comprise:

a first bus bar electrically connected to a positive electrical terminal;

a first set of electrodes extending from the first bus bar with a predefined spacing between adjacent electrodes;

a second bus bar electrically connected to a negative electrical terminal; and a second set of electrodes extending from the second bus bar with the predefined spacing between adjacent electrodes, wherein electrodes from the first set of electrodes are positioned between electrodes from the second set of electrodes.

5. The corrosion sensor of claim 1, wherein the interdigitated electrodes comprise at least one of copper, a copper alloy, and an aluminum alloy.

6. The corrosion sensor of claim 1, wherein the interdigitated electrodes comprise a material matching a material of a gas pipeline.

7. The corrosion sensor of claim 6, wherein the interdigitated electrodes comprise carbon steel.

8. The corrosion sensor of claim 1, wherein the hygroscopic layer comprises a dielectric material.

9. The corrosion sensor of claim 8, wherein the hygroscopic layer comprises a hygroscopic polymer.

10. The corrosion sensor of claim 9, wherein the hygroscopic polymer comprises one or more of cellulose acetate butyrate, polyacetylene, polyaniline, polymethyl methacrylate, polypyrrole, polyimide, plasma polymerized hexamethyldisilazane, polytetrafluoroethylene, and polyethersulfone.

11. The corrosion sensor of claim 8, wherein the hygroscopic layer comprises a ceramic material.

12. The corrosion sensor of claim 11, wherein the ceramic material comprises one or more of $MgCr_2O_4$, $TiO_2$, and $Al_2O_3$.

13. The corrosion sensor of claim 1, further comprising:

a power supply electrically coupled to the interdigitated electrodes and the non-corroding thermistor;

a light source optically coupled to the glass micro/nanofibers; and a light detector optically coupled to the glass micro/nanofibers.

14. The corrosion sensor of claim 13, further comprising one or more processors communicatively coupled to the interdigitated electrodes, the non-corroding thermistor, and the light detector, the one or more processors configured to determine a corrosion rate based on electrical signals received from the interdigitated electrodes, the non-corroding thermistor, and the light detector.

15. A method of monitoring corrosion in a pipeline, the method comprising:

receiving electrical signals from a corrosion sensor inside the pipeline, the corrosion sensor comprising a thermistor, interdigitated electrodes, and a hygroscopic layer having embedded glass micro/nanofibers, the glass micro/nanofibers configured to alter a wavelength of transmitted light in response to changes in strain caused by absorption or evaporation of water from the hygroscopic layer, the electrical signals representing states of the thermistor, the interdigitated electrodes, and the hygroscopic layer; and determining a corrosion rate of the pipeline based on the states of the thermistor, interdigitated electrodes, and the hygroscopic layer.

16. The method of claim 15, wherein receiving electrical signals comprises performing signal conditioning to reduce signal noise by performing at least one of amplifying the electrical signals and filtering the electrical signals.

17. The method of claim 15, wherein the electrical signals comprise a resistance of the thermistor, a capacitance of the interdigitated electrodes, and a detected wavelength of light transmitted through the embedded glass micro/nanofibers.

18. The method of claim 17, wherein determining the corrosion rate is based on the capacitance of the interdigitated electrodes.

19. The method of claim 17, further comprising determining a temperature inside the pipeline based on the resistance of the thermistor.

20. The method of claim 19, further comprising determining a rate of water condensation inside the pipeline based on the determined temperature and the detected wavelength of light.

* * * * *